(12) United States Patent
Rek

(10) Patent No.: US 8,103,215 B2
(45) Date of Patent: Jan. 24, 2012

(54) METHOD OF ESTABLISHING A DIRECT COMMUNICATION BETWEEN A FIRST WIRELESS PHONE AND A SECOND WIRELESS PHONE

(75) Inventor: Leonardus Henricus Maria Rek, Neuvillalais (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 427 days.

(21) Appl. No.: 12/306,121

(22) PCT Filed: Jul. 5, 2007

(86) PCT No.: PCT/IB2007/052629
§ 371 (c)(1),
(2), (4) Date: Dec. 22, 2008

(87) PCT Pub. No.: WO2008/004197
PCT Pub. Date: Jan. 10, 2008

(65) Prior Publication Data
US 2009/0239522 A1  Sep. 24, 2009

(30) Foreign Application Priority Data
Jul. 6, 2006  (EP) ..................... 06300762

(51) Int. Cl.
*H04B 7/00* (2006.01)

(52) U.S. Cl. ....... 455/41.2; 455/466; 455/418; 455/419; 709/228; 709/208

(58) Field of Classification Search ................ 455/41.2, 455/518, 519; 709/228, 208
See application file for complete search history.

(56) References Cited

U.S. PATENT DOCUMENTS

| | | | |
|---|---|---|---|
| 2004/0131188 A1* | 7/2004 | Wang et al. ................... | 380/270 |
| 2005/0083923 A1* | 4/2005 | Kimata et al. ................. | 370/386 |
| 2005/0164634 A1* | 7/2005 | Tanaka et al. ................. | 455/41.2 |
| 2007/0086394 A1* | 4/2007 | Yamada et al. ............... | 370/338 |
| 2007/0213039 A1* | 9/2007 | Skog ........................ | 455/414.3 |
| 2008/0123685 A1* | 5/2008 | Varma et al. ................. | 370/466 |

FOREIGN PATENT DOCUMENTS

EP  1182825 A2  2/2002

OTHER PUBLICATIONS

Singh K et al: "Peer-to-Peer Internet Telephony using SIP" Oct. 31, 2004, pp. 1-19, XP002336408 Retrieved from the Internet: URL :http://wwwl.cs.columbia.edu/{library/TR-repository/reports/reports-2004/cucs-044-04.pdf>.
Howie D et al: "Harnessing SIP for autonomous mobile peer-to-peer networking" Global Telecommunications Conference, 2005. Globecom '05. IEEE St. Loius, USA Nov. 28-Dec. 2, 2005, Piscataway, NJ, USA,IEEE, Nov. 28, 2005, pp. 879-883, XP010879592 ISBN: 0-7803-9414-3.

* cited by examiner

*Primary Examiner* — Kamran Afshar
*Assistant Examiner* — Dung Lam

(57) ABSTRACT

Method of communicating between a first wireless phone and a second wireless phone A method of communicating between a first wireless phone (A) and a second wireless phone (B), each of said first and second wireless phones comprising a wireless transceiver for exchanging data using a signaling protocol, said method comprising the steps of: initiating a direct communication between the two wireless phone via a first stimulus on the first wireless phone and a second stimulus on the second wireless phone, configuring the first wireless phone with a first predefined IP address (IP_A) and a first signaling protocol identifier (SIP_A), and the second wireless phone with a second predefined IP address (IP_B) and a second signaling protocol identifier (SIP_B), the first, respectively second, phone knowing the second, respectively first, IP address, the second, respectively first, signaling protocol identifier and a predefined wireless network identifier (SSID), establishing a direct communication between the two wireless phones using their wireless transceivers and the signaling protocol on the basis of the first and second predefined IP addresses, the first and second predefined signaling protocol identifiers and the predefined wireless network identifier.

10 Claims, 1 Drawing Sheet

| MEM_A | | MEM_B | |
|---|---|---|---|
| SIP_A | 123456 | SIP_B | 654321 |
| IPA_A | 192.168.1.10 | IPA_B | 192.168.1.11 |
| SIP_B | 654321 | SIP_A | 123456 |
| IPA_B | 192.168.1.11 | IPA_A | 192.168.1.10 |
| SSID | PHILIPS | SSID | PHILIPS |

METHOD OF ESTABLISHING A DIRECT COMMUNICATION BETWEEN A FIRST WIRELESS PHONE AND A SECOND WIRELESS PHONE

FIELD OF THE INVENTION

The invention relates generally to a method of communicating between a first wireless phone and a second wireless phone. The invention also relates to a wireless communication system comprising a first wireless phone and a second wireless phone.

BACKGROUND OF THE INVENTION

One of the consequences of the generalization of Internet connections at private users' premises is the appearance of consumer voice telephony services that make use of this connection. In the last few years, videophone products and services have appeared as increased connection speeds allow good quality video telephony. The most advanced videophones are cordless phones, generally according to the wireless standard IEEE802.11, also referred to as WiFi.

Several protocols have been developed with the purpose to manage the establishment and monitoring of telephony connections, of which the protocol Session Initiation Protocol (SIP) has become the dominant protocol, both for voice and video telephony. SIP is a signaling protocol for initiating, managing and terminating voice and video sessions across packet networks.

A conventional communication using the SIP protocol is depicted in FIG. 1. It comprises a first wireless videophone A and a second wireless videophone B.

For a wireless videophone to connect to the network NET, an intermediary device must be used which is connected on one side to the wireless videophone via a wireless connection (e.g. WiFi connection) and on the other side to the network via a suitable IP (stands for Internet Protocol) connection (e.g. ADSL, cable). This intermediary device is often referred to as a wireless gateway, wireless modem, wireless modem/router, and will be referred to as a wireless base station BS_A or BS_B in the following.

For one videophone A to call another videophone B, specific SIP management devices need to be present in the network that provides the connection between these two phones. A basic implementation of such a network consists of a single SIP management device, referred to as a SIP server SERV in the following.

The main task of the SIP server is to detect requests for calls from the wireless videophones, and provide these videophones with the required information that allows a connection between two phones to be established. One of the most important information required for establishing a SIP connection consists of the IP addresses and the SIP identifiers of both videophones. The calling videophone knows the SIP identifier (e.g. a telephone number) of the called videophone, but not its IP address. The SIP server delivers this IP address.

SUMMARY OF THE INVENTION

Thus, it is an object of the present invention to provide a method of communicating between two wireless phones using a SIP-like protocol but without using a network, a SIP-like server or even a wireless base station.

The invention takes the following aspect into consideration. Professionals in the telecommunication industry and sales staff in retail stores often have the need to demonstrate wireless phones without neither having access to a network with a suitable SIP-like server nor the possibility to put wireless base stations in place. In these cases it is not possible to make a call between these wireless phones.

In accordance with the present invention, there is provided a method of communicating between a first wireless phone and a second wireless phone, each of said first and second wireless phones comprising a wireless transceiver for exchanging data using a signaling protocol, said method comprising the steps of:

initiating a direct communication between the two wireless phone via a first stimulus on the first wireless phone and a second stimulus on the second wireless phone, configuring the first wireless phone with a first predefined IP address and a first signaling protocol identifier, and the second wireless phone with a second predefined IP address and a second signaling protocol identifier, the first, respectively second, phone knowing the second, respectively first, IP address, the second, respectively first, signaling protocol identifier and a predefined wireless network identifier, establishing a direct communication between the two wireless phones using their wireless transceivers and the signaling protocol on the basis of the first and second predefined IP addresses, the first and second predefined signaling protocol identifiers and the predefined wireless network identifier.

The invention extends to a corresponding communication system comprising a first wireless phone and a second wireless phone able to exchange data using a signaling protocol.

The invention also relates to a wireless phone for use in such a communication system.

The communication method and system in accordance with the invention makes it possible to establish a direct communication between the first and second wireless phones, first thanks to an activation of the wireless phones which is initiated with two different stimuli on said phones. Then, the memory of the first (respectively second) wireless phone contains the required parameters of the second (respectively first) wireless phone, enabling said first (respectively second) wireless phone to retrieve a predefined IP address and a predefined signaling protocol (e.g. SIP) identifier of the second (respectively first) wireless phone and thus simulating the function of the signaling protocol server in reply to a request of the first (respectively second) wireless phone. As a consequence, the signaling protocol server and the network are not needed. Finally, the first wireless phone and the second wireless phone are able to establish a direct wireless connection thanks to the use of the predefined wireless network identifier (in this case the wireless network will only have two client devices: the first and second wireless phones), and thus without requiring the use of a base station.

Beneficially, the wireless transceivers are WiFi transceivers. In this case, the predefined wireless network identifier is a Service Set Identifier identifier.

Alternatively, the wireless transceivers are Bluetooth transceivers. In this case, an additional connection parameter is contained in the memory of both wireless phones, namely a Personal Identification Number PIN code, this parameter being exchanged between the phones during an authentication process.

The signaling protocol may be the Session Initiation Protocol. The wireless phone may be a videophone.

Beneficially, the step of initiating includes one of a long press on a specific key, a specific key press sequence, a specific simultaneous press on a combination of keys, a press on a dedicated key or switch, or a item in a menu that can be selected by navigating to this item.

These and other aspects of the present invention will be apparent from, and elucidated with reference to, the embodiment described herein.

BRIEF DESCRIPTION OF THE DRAWINGS

An embodiment of the present invention will now be described by way of example only and with reference to the accompanying drawings, in which.

DETAILED DESCRIPTION OF THE INVENTION

Figure 1:
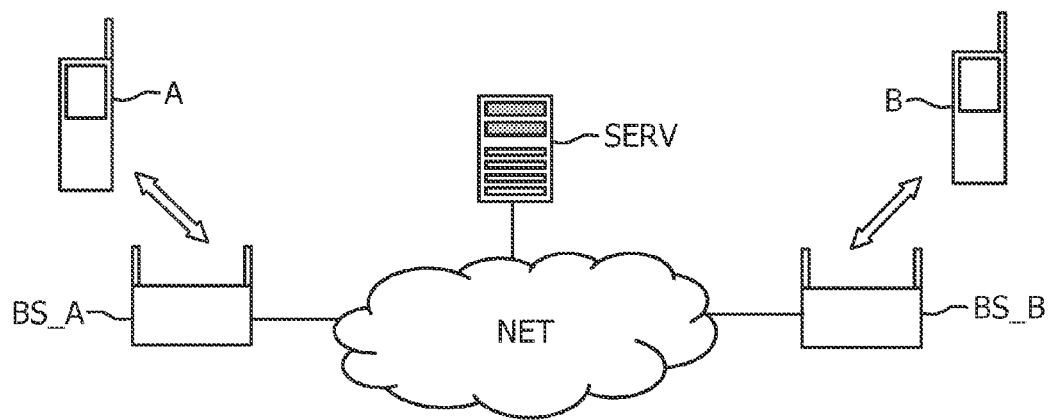
FIG. 1 is a schematic block diagram of a conventional wireless communication system using the SIP protocol.
Figure 2:
FIG. 2 is a schematic block diagram of a wireless communication system in accordance with the invention.

Referring to FIG. 2, a schematic block diagram of a wireless communication system in accordance with the invention is depicted. It comprises a first wireless phone A and a second wireless phone B able to exchange data using a signaling protocol. In the following, the invention will be described in the context of the SIP protocol but it will be apparent to a skilled person that the invention stays applicable to any other signaling protocol equivalent to the SIP protocol.

The first, respectively second, wireless phone comprises a transceiver (not represented) for establishing a direct communication with the second, respectively first, wireless phone using the signaling protocol on the basis of IP addresses, signaling protocol identifiers and a wireless network identifier. The invention is described in the context of a wireless connection according to the standard IEEE 802.11, hereinafter referred to as WiFi, but it would be apparent to a skilled person that the invention is applicable to any other wireless connection such as Bluetooth for example.

In order to make a Bluetooth connection, one of the wireless phones must enter an association mode and start looking for other Bluetooth phones. Once a wireless phone has found another wireless phone, the Bluetooth connection needs a two-way authentication (or pairing) based on a 4-digit PIN code, which can be predefined in both wireless phones.

Each of the wireless phones comprises a digital signal processor DSP (not represented) for performing audio and video coding and decoding according to known standard, such as G.711 or G.729 for audio codecs and H.263 or H.264 for video codecs, supported by the SIP protocol.

Each of the wireless phones also comprises means for initiating a direct communication between the first wireless phone and the second wireless phone and a memory containing specific parameters, as it will be described in more details hereinafter.

The wireless phone is preferably a videophone but can also be a conventional phone, namely without video functionality.

More especially, the wireless phones in accordance with the invention embeds a specific demonstration mode, also called a SIP video intercom mode, that makes it possible to establish calls using the standard SIP protocol between the two videophones without the need of a network, wireless base station or SIP server.

The demonstration mode comprises the following phases:
the start of the demonstration mode,
the configuration of the videophones,
the connection of the videophones,
the establishment of a video call,
the video call release, and
the exit the demonstration mode.

In a first step, the demonstration mode is started. To this end, each videophone needs to receive an external stimulus that results in the initialization of the demonstration mode as this mode is not identical to the mode in which the videophone is connected to a wireless base station through which it is connected to a network in which a SIP server is present.

The most suitable but not exclusive manner for a videophone to receive this external stimulus is through the use of a keyboard that is typically present on such a product.

A few examples of manners to activate the demonstration mode are listed below:
a long press on a specific key,
a specific key press sequence,
a specific simultaneous press on a combination of keys,
a press on a dedicated key or switch, or
a item in a menu that can be selected by navigating to this item.

In a second step, the videophones are configured. For a videophone A to call another videophone B, the required conditions are:

videophone A must have a valid IP address IP_A (e.g. 192.168.1.10 in FIG. 2), videophone A must have a valid SIP identifier SIP_A (name or number, often a telephone number, e.g. 123456 in FIG. 2), videophone B must have a valid IP address IP_B not identical to the address of videophone A (e.g. 192.168.1.11 in FIG. 2), videophone B must have a valid SIP identifier SIP_B not identical to the SIP identifier of videophone A (name or number, often a telephone number, e.g. 654321 in FIG. 2), videophone A must know the IP address and the SIP identifier of videophone B, videophone B must know the IP address and the SIP identifier of videophone A, videophones A and B must use the same wireless network identifier SSID (for Service Set IDentifier, e.g. PHILIPS in FIG. 2).

As the configuration of videophone A is not identical to the configuration of videophone B, an external stimulus is required which is not identical for both videophones. A few examples to obtain this result are listed below:

a specific manner (e.g. *#31) to activate the demonstration mode for videophone A and another specific manner (e.g. *#32) to activate the demonstration mode for videophone B;

a common manner to activate the demonstration mode for both videophones followed by a different stimulus for each videophone (for example, a selection of an item in a menu, a drop-down list to identify if the videophone must be configured as videophone A or videophone B).

After this differentiation of the videophones, a fixed and known IP address and a fixed and known SIP identifier are attributed to videophone A and another fixed and known IP address and another fixed and known SIP identifier are attributed to videophone B.

Furthermore, videophone A knows the IP address and SIP identifier of videophone B and visa versa. These addresses and SIP identifiers are pre-programmed in both videophones and are fixed and known.

Finally, a single fixed and known SSID identifier is attributed to both videophones.

Each videophone has a WiFi transceiver that could function in two different modes:

Infrastructure mode: this mode is used when connected to a base station and allows several WiFi devices to connect to a single base station. In this mode the base station manages the wireless connection or connections Ad-hoc mode (i.e. the demo mode in our case): this mode allows two WiFi devices to establish a direct wireless connection without the use of a wireless base station.

Both modes are standardized and part of the standard IEEE802.11

After the start of the demonstration mode, the WiFi transceivers of both videophones are set in the ad-hoc mode and are forced to use a common pre-programmed WiFi identifier SSID.

In a third step the connection of the videophones is established. Once the videophones are configured as described above, the wireless transceivers of both videophones are able to establish a wireless connection, which allows the videophone to exchange SIP messages in order to establish and terminate a call.

In a fourth step a video call is established. A call from videophone A to videophone B can be established by using the standard SIP message INVITE, for which the format of the relevant part of the total message is formatted in the following manner:

INVITE sip:[SIP identifier of videophone B]@[IP address of videophone B]

Videophone B receives the INVITE message from videophone A and sends standard SIP messages to accept the call.

The manner in which the user interface of a videophone places or accepts a call can vary widely. For example, the user of videophone A may type the SIP identifier of videophone B on a keyboard and press an off-hook key to place the call. To accept a call, the user of videophone B may press an off-hook key.

Alternatively, as the SIP identifiers are fixed and known, the user interface of videophone A may work in such a manner that simply pressing an off-hook key results in placing a call using the SIP identifier of videophone B.

The fifth step consists in the video call release. Optionally it may be possible to terminate a video call during the demonstration mode in various manners. The most obvious manner is to press an on-hook key. If the videophone has a single key for on-hook and off-hook, this key could be used to terminate the call.

Finally the last step is the exit the demonstration mode. As the demonstration mode is a mode that is not identical to the normal mode in which the videophone functions when connected to a wireless base station and a network, it is recommendable to implement a manner to exit the demonstration mode and return to the normal mode. An external stimulus is required to exit the demonstration mode and could be implemented in various manners:

a long press on a specific key,
a specific key press sequence,
a specific simultaneous press on a combination of keys,
a press on a dedicated key or switch,
a item in a menu that can be selected by navigating to this item, or
by switching off the videophone.

This invention proposal makes it possible to establish video and voice calls using the standard SIP protocol without the need of a network, wireless base station or SIP server. In practice it enables a large-scale deployment of demonstrations in retail stores to support sales, and practical demonstration performed by professionals in the telecommunication industry. This demo mode can also be used at home for audio/video intercom mode.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa.

The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of communicating between a first wireless phone (A) and a second wireless phone (B) in an audio/video intercom mode, each of said first and second wireless phones comprising a wireless transceiver for exchanging data using a signaling protocol, said method comprising the steps of:
    initiating a direct communication between the two wireless phone via a first stimulus on the first wireless phone and a second stimulus on the second wireless phone, wherein the first stimulus is not identical to the second stimulus;
    configuring the first wireless phone with a first predefined IP address (IP_A) and a first signaling protocol identifier (SIP_A) according to a first configuration, and the second wireless phone with a second predefined IP address and a second signaling protocol identifier (SIP_B) according to a second configuration, wherein the first and second predefined IP addresses and signaling protocol identifiers are fixed and known, the first, respectively second, phone knowing the second, respectively first, IP address, the second, respectively first, signaling protocol identifier and a predefined wireless network identifier (SSID), wherein the predefined wireless network, identifier comprises a single fixed and known SSID identifier attributed to both the first and second wireless phones, and wherein the first configuration is not identical to the second configuration; and
    establishing a direct communication between the two wireless phones using (a) their wireless transceivers and (b) the signaling protocol (c) on the basis of (c)(i) the first and second predefined IP addresses, (c)(ii) the first and second predefined signaling protocol identifiers and (c)(iii) the predefined wireless network identifier, wherein after a start of the audio/video intercom mode, both the first wireless phone (A) and the second wireless phone (B) are forced to use the predefined wireless network identifier (SSID), to establish video and voice calls between the two wireless phones using the signaling protocol without a network, wireless base station, or signaling protocol server.

2. The method as claimed in claim 1, wherein the wireless transceivers are WiFi transceivers.

3. The method as claimed in claim 2, wherein the predefined wireless network identifier is a Service Set Identifier.

4. The method as claimed in claim 1, wherein the wireless transceivers are Bluetooth transceivers.

5. The method as claimed in claim 4, wherein a defined Personal Identification Number code is exchanged for authentication purpose.

6. The method as claimed in claim 1, wherein the signaling protocol is the Session Initiation Protocol.

7. The method as claimed in claim 1, wherein the wireless phone is a videophone.

8. The method as claimed in claim 1, wherein the step of initiating includes one of:
   a long press on a specific key,
   a specific key press sequence,
   a specific simultaneous press on a combination of keys,
   a press on a dedicated key or switch, or
   an item in a menu that can be selected by navigating to this item.

9. A communication system comprising a first wireless phone (A) and a second wireless phone (B) able to exchange data using a signaling protocol in an audio/video intercom mode, each of said first and second wireless phones each comprising:
   means for initiating a direct communication between said first wireless phone and said second wireless phone via a first stimulus on the first wireless phone and a second stimulus on the second wireless phone, wherein the first stimulus is not identical to the second stimulus;
   a memory (MEM_A, MEM_B) containing a first predefined IP address (IP_A) and a first signaling protocol identifier (SIP_A) corresponding to the first wireless phone, a second predefined IP address (IP_B) and a second signaling protocol identifier (SIP_B) corresponding to said second wireless phone, and a predefined wireless network identifier (SSID), wherein the first and second predefined IP addresses and signaling protocol identifiers are fixed and known, and wherein the predefined wireless network identifier comprises a single fixed and known SSID identifier attributed to both the first and second wireless phones; and
   a transceiver for establishing a direct communication between the first wireless phone and the second wireless phone using the signaling protocol on the basis of the first and second predefined IP addresses, the first and second predefined signaling protocol identifiers and the predefined wireless network identifier, wherein after a start of the audio/video intercom mode, both the first wireless phone and the second wireless phone are forced to use the predefined wireless network identifier (SSID), to establish video and voice calls between the two wireless phones using the signaling protocol without a network, wireless base station, or signaling protocol server.

10. A wireless phone (A) comprising:
   means for initiating a direct communication between said wireless phone and another wireless phone via a first stimulus on the wireless phone and a second stimulus on the another wireless phone, wherein the first stimulus is not identical to the second stimulus, wherein the wireless phone and the another phone are able to exchange data using a signaling protocol in an audio/video intercom mode;
   a memory (MEM_A) containing a first predefined IP address (IP_A) and a first signaling protocol identifier (SIP_A) corresponding to said wireless phone, a second predefined IP address (IP_B) and a second signaling protocol identifier (SIP_B) corresponding to said another wireless phone, and a predefined wireless network identifier (SSID), wherein the first and second predefined IP addresses and signaling protocol identifiers are fixed and known, and wherein the predefined wireless network identifier comprises a single fixed and known SSID identifier attributed to both the wireless phone and the another wireless phone; and
   a transceiver for establishing a direct communication with the another wireless phone using the signaling protocol on the basis of the first and second predefined IP addresses, the first and second predefined signaling protocol identifiers and the predefined wireless network identifier, wherein after a start of the audio/video intercom mode, both the first wireless phone and the second wireless phone are forced to use the predefined wireless network identifier (SSID), to establish video and voice calls between the wireless phone and the another wireless phone using the signaling protocol without a network, wireless base station, or signaling protocol server.

\* \* \* \* \*